(12) United States Patent
Oh et al.

(10) Patent No.: US 11,744,684 B2
(45) Date of Patent: *Sep. 5, 2023

(54) DENTAL COMPOSITE BLANK HAVING MULTIPLE LAYERS AND METHOD FOR MANUFACTURING SAME

(71) Applicant: VERICOM CO., LTD., Chuncheon-si (KR)

(72) Inventors: Myung-Hwan Oh, Seoul (KR); Jong-Ho Kang, Bucheon-si (KR); Hyun-Chul Yoo, Gunpo-si (KR); Yun-Ki Kim, Anyang-si (KR)

(73) Assignee: VERICOM CO., LTD., Chuncheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/418,202

(22) PCT Filed: Dec. 20, 2019

(86) PCT No.: PCT/KR2019/018208
§ 371 (c)(1),
(2) Date: Jun. 24, 2021

(87) PCT Pub. No.: WO2020/138862
PCT Pub. Date: Jul. 2, 2020

(65) Prior Publication Data
US 2022/0079724 A1 Mar. 17, 2022

(30) Foreign Application Priority Data
Dec. 28, 2018 (KR) .................. 10-2018-0172232

(51) Int. Cl.
*A61C 13/00* (2006.01)
*B32B 7/023* (2019.01)
(Continued)

(52) U.S. Cl.
CPC ........ *A61C 13/0022* (2013.01); *A61C 13/082* (2013.01); *A61C 13/09* (2013.01);
(Continued)

(58) Field of Classification Search
CPC ... A61C 13/0022; A61C 13/082; A61C 13/09; A61C 13/081; A61C 13/087;
(Continued)

(56) References Cited

U.S. PATENT DOCUMENTS

| 6,379,593 | B1* | 4/2002 | Datzmann ............... A61K 6/17 264/16 |
| 2016/0128812 | A1* | 5/2016 | Nakayama ........... A61C 13/087 264/19 |
| 2017/0252136 | A1* | 9/2017 | Fung ...................... A61C 13/26 |

FOREIGN PATENT DOCUMENTS

| JP | 2004035332 A | 2/2004 |
| JP | 2014161440 A | 9/2014 |

(Continued)

OTHER PUBLICATIONS

International search report of PCT/KR2019/018208, dated Apr. 6, 2020, English translation.
(Continued)

*Primary Examiner* — Christopher W Raimund
(74) *Attorney, Agent, or Firm* — STIP Law Group, LLC

(57) ABSTRACT

Proposed is a method of manufacturing a dental composite blank. The method of manufacturing the dental composite blank includes (a) pressurizing a laminate for a composite blank having multiple layers having different colors at a first pressure ($P_1$), (b) pressurizing the laminate for a composite blank, pressurized at the first pressure, at a second pressure ($P_2$), and (c) manufacturing a composite blank by curing the pressurized laminate for a composite blank, in which steps (a) and (b) are each independently performed once or
(Continued)

multiple times, and the first pressure ($P_1$) is less than or greater than the second pressure ($P_2$), ultimately making it possible to manufacture a dental composite blank that is similar to a natural tooth and thus exhibits a superior aesthetic appearance and high interlayer bonding strength.

12 Claims, 4 Drawing Sheets

(51) Int. Cl.
| | |
|---|---|
| *A61C 13/08* | (2006.01) |
| *A61C 13/09* | (2006.01) |
| *B32B 27/08* | (2006.01) |
| *B32B 37/10* | (2006.01) |
| *B32B 37/02* | (2006.01) |
| *B32B 38/14* | (2006.01) |
| *B32B 38/00* | (2006.01) |

(52) U.S. Cl.
CPC .............. *B32B 7/023* (2019.01); *B32B 27/08* (2013.01); *B32B 37/02* (2013.01); *B32B 37/10* (2013.01); *B32B 38/14* (2013.01); *B32B 2038/0076* (2013.01); *B32B 2309/02* (2013.01); *B32B 2309/12* (2013.01); *B32B 2309/60* (2013.01); *B32B 2535/00* (2013.01)

(58) Field of Classification Search
CPC ......... B32B 7/023; B32B 27/08; B32B 37/02; B32B 37/10; B32B 38/14; B32B 2038/0076; B32B 2309/02; B32B 2309/12; B32B 2309/60; B32B 2535/00; B32B 27/20; B32B 2250/24; B32B 2264/10; B32B 2264/1021; B32B 2264/12; B32B 2264/301; B32B 2264/302; B32B 2307/4026; B32B 2307/546; B32B 27/308
See application file for complete search history.

(56) References Cited

FOREIGN PATENT DOCUMENTS

| | | | |
|---|---|---|---|
| JP | 2017113224 A | * | 6/2017 |
| JP | 2017113224 A | | 6/2017 |
| KR | 101792680 B1 | | 11/2017 |
| WO | WO2016104724 A1 | | 6/2016 |

OTHER PUBLICATIONS

Office Action from Korean Intellectual Property Office of 10-2018-0172232, dated Nov. 6, 2019.

* cited by examiner

DENTAL COMPOSITE BLANK HAVING MULTIPLE LAYERS AND METHOD FOR MANUFACTURING SAME

CROSS-REFERENCE TO RELATED APPLICATIONS

This application is the U.S. National Phase under 35 U.S.C. § 371 of International Application No. PCT/KR2019/018208 filed on Dec. 20, 2019, which in turn claims the benefit of Korean Application No. 10-2018-0172232 filed on Dec. 28, 2018, the disclosures of which are incorporated by reference into the present application.

TECHNICAL FIELD

The present disclosure relates to a method of manufacturing a dental composite blank, and more particularly to a dental composite blank having multiple layers and a method of manufacturing the same.

BACKGROUND ART

Dental prosthetic materials used in dental prosthetics are key dental materials that are used for a very wide range of dental treatment, such as tooth fixation or aesthetic dentistry, in addition to general dental procedures for fixing loose teeth or repairing an entire crown or damaged area of a tooth caused by a cavity or fracturing of the tooth.

Typical dental prostheses include restorations, supplements, inlays, onlays, veneers, whole and partial crowns, bridges, implants, posts, and the like. Prostheses are manually manufactured by a dentist with expertise or are manufactured by a dental technician, who is a professional engineer skilled in dental technology.

Due to the recent development of technology, computer automation devices such as optical devices, digital devices, mechanical milling devices and CAD/CAM devices have significantly reduced the amount of manual labor performed by dental technicians and the time required to manufacture dental prostheses. Such computer automation devices are capable of manufacturing dental prostheses by cutting, milling, and crushing the restoration into the correct shape and form as required at a faster speed and with less labor than conventional manual methods.

Dental prostheses made using CAD/CAM devices typically use mill blanks, that is, solid blanks, which are the materials from which the prosthesis is cut or shaped. A mill blank is typically made of a material such as zirconia, glass ceramics, recently introduced hybrid ceramics, etc. However, since these materials are composed of a single color, there is a problem in that it is difficult to realize various color gradients related to differences between the tip of the tooth, the tooth surface, and the tooth gum side, like a natural tooth. The mill blank of zirconia and glass ceramics is processed through coping, and also uses a process of building up a glass powder to achieve a color similar to that of a natural tooth, but it is difficult to manufacture, even by skilled technicians. Moreover, hybrid ceramics, which are a resin for restoration, imitate natural teeth using a monomer having a color applied thereto, but they are not monolithic, and thus there is a problem in that it is easy to separate, break, and abrade the same.

DISCLOSURE

Technical Problem

The present disclosure has been made keeping in mind the problems encountered in the related art, and an objective of the present disclosure is to provide a dental composite blank and a method of manufacturing the same in which the dental composite blank includes composition layers having different colors, making it possible to realize a restoration having a color gradient similar to that of a natural tooth, thus exhibiting a superior aesthetic appearance.

Another objective of the present disclosure is to provide a method of manufacturing a dental composite blank having improved mechanical properties, which is capable of effectively removing bubbles between composition layers and thus increasing interlayer bonding strength by repeatedly pressurizing a composite paste having different colors at different pressures before curing.

Still another objective of the present disclosure is to provide a dental composite blank that may be used for a veneer and a crown of a posterior tooth (molar) because it may realize a natural tooth color gradient.

Technical Solution

An aspect of the present disclosure provides a method of manufacturing a dental composite blank, including: (a) pressurizing a laminate for a composite blank having multiple layers having different colors at a first pressure $P_1$; (b) pressurizing the laminate for a composite blank, pressurized at the first pressure, at a second pressure $P_2$; and (c) manufacturing a composite blank by curing the pressurized laminate for a composite blank, in which steps (a) and (b) are each independently performed once or multiple times, and the first pressure $P_1$ is less than or greater than the second pressure $P_2$.

In addition, the method of manufacturing the composite blank may further include (1) manufacturing a laminate for a composite blank by laminating composition layers for a composite blank having different colors, before step (a).

In addition, the method of manufacturing the composite blank may further include (2) placing a laminate for a composite blank having layers having different colors in a mold, before step (a).

The laminate for a composite blank may include 2 to 10 layers.

The laminate for a composite blank may include 3 to 7 layers.

The laminate for a composite blank may include a first composition layer, a second composition layer having a different color laminated on the first composition layer, and a third composition layer having a different color laminated on the second composition layer. In addition, a plurality of additional layers may be laminated thereon.

The layers of the laminate for a composite blank may be laminated in a manner in which a color transitions from light to dark upwards from the bottom layer, in which a color transitions from dark to light upwards from the bottom layer, in which a color transitions from dark to light and then to dark upwards from the bottom layer, or in which a color transitions from light to dark and then to light upwards from the bottom layer.

In addition, each of steps (a) and (b) may be performed 1 to 20 times, and steps (a) and (b) may be alternately performed.

In addition, step (a) may be performed multiple times, and during step (a) performed multiple times, a pressure $P_1$ (1) in step (a) performed first may be identical to or different from a pressure $P_1$ (2) in step (a) performed later.

In addition, step (b) may be performed multiple times, and during step (b) performed multiple times, a pressure $P_2$ (1)

in step (b) performed first may be identical to or different from a pressure $P_2$ (2) in step (b) performed later.

In addition, any one of the first pressure $P_1$ and the second pressure $P_2$ may be 5 to 300 MPa, and the remaining one thereof may be 1 to 10 MPa.

In addition, a difference between the first pressure $P_1$ and the second pressure $P_2$ may be 5 to 299 MPa.

In addition, at least one of steps (a) and (b) may be performed at a temperature at which the laminate for a composite blank is not cured.

In addition, at least one of steps (a) and (b) may be performed at 10 to 59° C.

In addition, in each of steps (a) and (b), the laminate for a composite blank may not be cured.

In addition, steps (a) and (b) may be performed in an atmosphere of any one of an inert gas and a fluid.

In addition, the inert gas may include at least one selected from the group consisting of nitrogen, helium, neon, argon, and krypton.

In addition, the fluid may include oil or water.

In addition, step (c) may be performed at a pressure of 5 to 300 MPa.

In addition, step (c) may be performed at a temperature at which the laminate for a composite blank is cured.

In addition, step (c) may be performed at a temperature of 80 to 200° C.

In addition, step (c) may be performed for a time ranging from 10 minutes to 24 hours.

In addition, at least one layer of the laminate for a composite blank may include 100 parts by weight of an unsaturated-double-bond compound including at least one selected from the group consisting of a monomer having an unsaturated double bond and an oligomer of a monomer having an unsaturated double bond, 50 to 1,000 parts by weight of a filler, 0.01 to 5 parts by weight of a polymerization initiator, and 0.01 to 5 parts by weight of a colorant.

In addition, at least one layer of the laminate for a composite blank may include 150 to 700 parts by weight of the filler based on 100 parts by weight of the unsaturated-double-bond compound.

In addition, at least one layer of the laminate for a composite blank may include 400 to 500 parts by weight of the filler based on 100 parts by weight of the unsaturated-double-bond compound.

In addition, the unsaturated-double-bond compound may include at least one selected from the group consisting of 2,2-bis[4-(2-hydroxy-3-methacryloxypropoxy)phenyl]propane (Bis-GMA), ethylene glycol dimethacrylate (EGDMA), ethylene glycol diacrylate (EDGA), triethylene glycol dimethacrylate (TEGDMA), triethylene glycol diacrylate (TEGDA), ethoxylated bisphenol A dimethacrylate (Bis-EMA), urethane dimethacrylate (UDMA), polyurethane diacrylate (PUDA), dipentaerythritol pentaacrylate monophosphate (PENTA), 2-hydroxyethyl methacrylate (HEMA), polyalkenoic acid, biphenyl dimethacrylate (BPDM), biphenyl diacrylate (BPDA), and glycerol phosphate dimethacrylate (GPDM).

In addition, the filler may include at least one selected from the group consisting of an inorganic filler and an organic filler.

In addition, the inorganic filler may include at least one selected from the group consisting of synthetic amorphous silica, crystalline silica, barium silicate, barium borosilicate, barium fluoroaluminoborosilicate, barium aluminoborosilicate, strontium silicate, strontium borosilicate, strontium aluminoborosilicate, calcium silicate, aluminosilicate, silicon nitride, titanium dioxide, calcium hydroxyapatite, zirconia, and bioactive glass.

In addition, the polymerization initiator may include at least one selected from the group consisting of a photopolymerization initiator and a thermal polymerization initiator.

In addition, the colorant may include at least one selected from the group consisting of iron oxide (iron III oxide) and titanium dioxide ($TiO_2$).

Another aspect of the present disclosure provides a dental composite blank having multiple layers, in which the multiple layers include layers having different colors, each of the multiple layers independently includes 100 parts by weight of a matrix including a polymer obtained by polymerizing an unsaturated-double-bond compound including at least one selected from the group consisting of a monomer having an unsaturated double bond and an oligomer of a monomer having an unsaturated double bond, 50 to 1,000 parts by weight of a filler dispersed in the matrix, and 0.01 to 5 parts by weight of a colorant dispersed in the matrix and the filler, and the flexural strength of the composite blank is 180 MPa or more.

In addition, the flexural strength may be 230 MPa or more.

In addition, the flexural strength may be 230 to 250 MPa.

In addition, the composite blank may have a color that mimics that of teeth.

In addition, the layers of the composite blank may be configured such that brightness increases toward the upper layer from the lower layer.

Advantageous Effects

According to a dental composite blank of the present disclosure and a method of manufacturing the same, the dental composite blank is configured to include layers having different colors, so a color gradient similar to that of a natural tooth can be realized, and thus a superior aesthetic appearance for prostheses can be exhibited.

In addition, according to the dental composite blank of the present disclosure and the method of manufacturing the same, the composition layers for a composite blank having different colors are repeatedly pressurized at different pressures before curing, so bubbles between the layers are capable of being removed, thereby increasing the bonding strength between the composition layers, ultimately preventing interlayer separation and improving mechanical properties.

BEST MODE

The present disclosure may be embodied in many different forms, and exemplary embodiments of the present disclosure may be described in detail. However, the present disclosure should not be construed as being limited only to the embodiments set forth herein, but should be understood to cover all modifications, equivalents or alternatives falling within the spirit and technical scope of the present disclosure. In the description of the present disclosure, detailed descriptions of related known techniques incorporated herein will be omitted when the same may make the gist of the present disclosure unclear.

As used herein, the terms "first", "second", etc. may be used to describe various elements, but these elements are not to be limited by these terms. These terms are only used to distinguish one element from another. For example, a first element may be termed a second element, and similarly, a second element may be termed a first element, without departing from the scope of the present disclosure.

Further, it will be understood that when an element is referred to as being "formed" or "laminated" on another element, it can be formed or laminated so as to be directly attached to all surfaces or to one surface of the other element, or intervening elements may be present therebetween.

Unless otherwise stated, a singular expression includes a plural expression. In this application, the terms "comprise", "include" or "have" are used to designate the presence of features, numbers, steps, operations, elements, parts, or combinations thereof described in the specification, and should be understood as not excluding the presence or additional possible presence of one or more different features, numbers, steps, operations, elements, parts, or combinations thereof.

Figure 1:
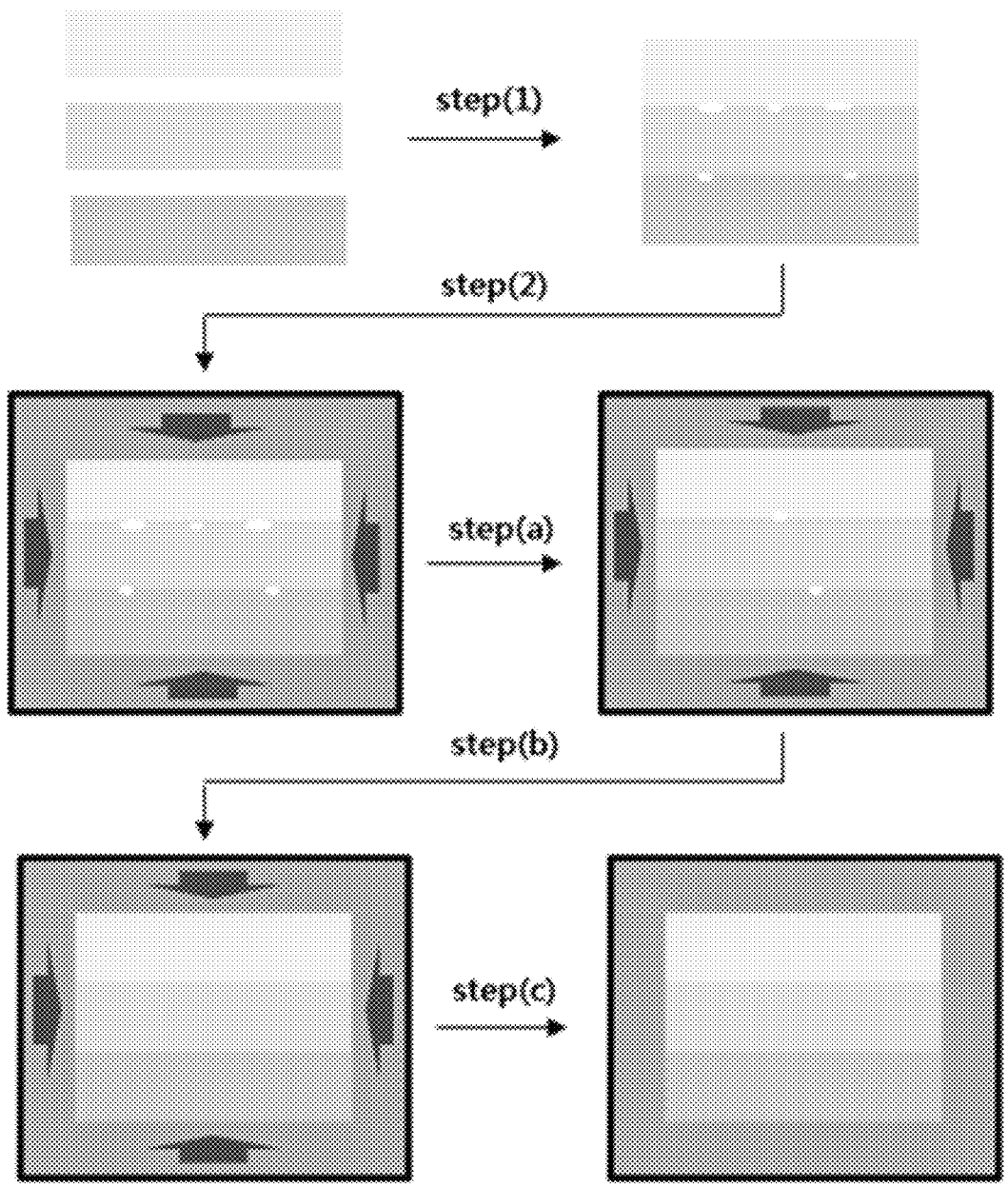
FIG. 1 is a flowchart schematically showing a process of manufacturing a composite blank using a laminate for a dental composite blank in which compositions having different colors are laminated according to an embodiment of the present disclosure.
Figure 2:
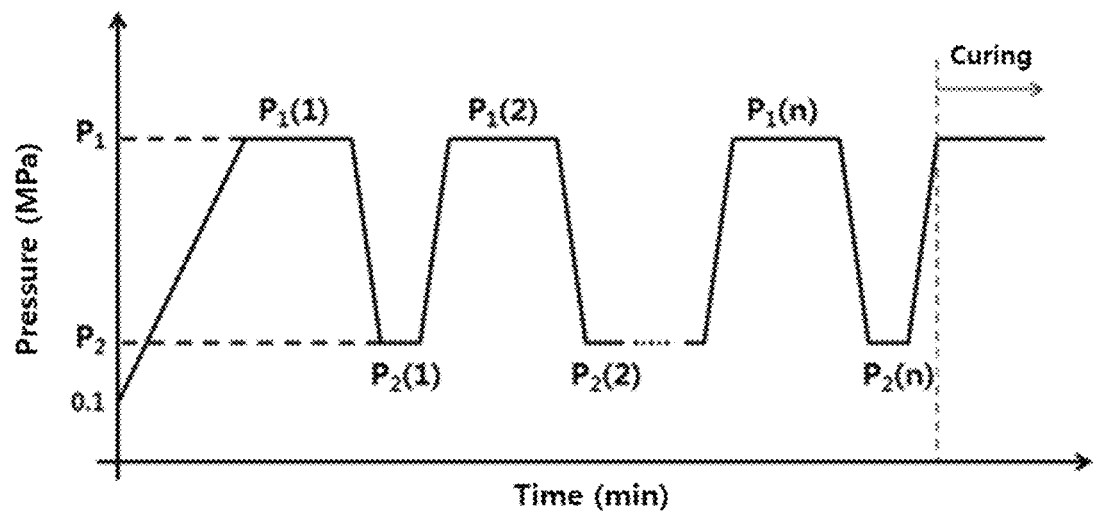
FIG. 2 schematically shows a pressurizing profile for manufacturing a composite blank according to an embodiment of the present disclosure.
Figure 3:
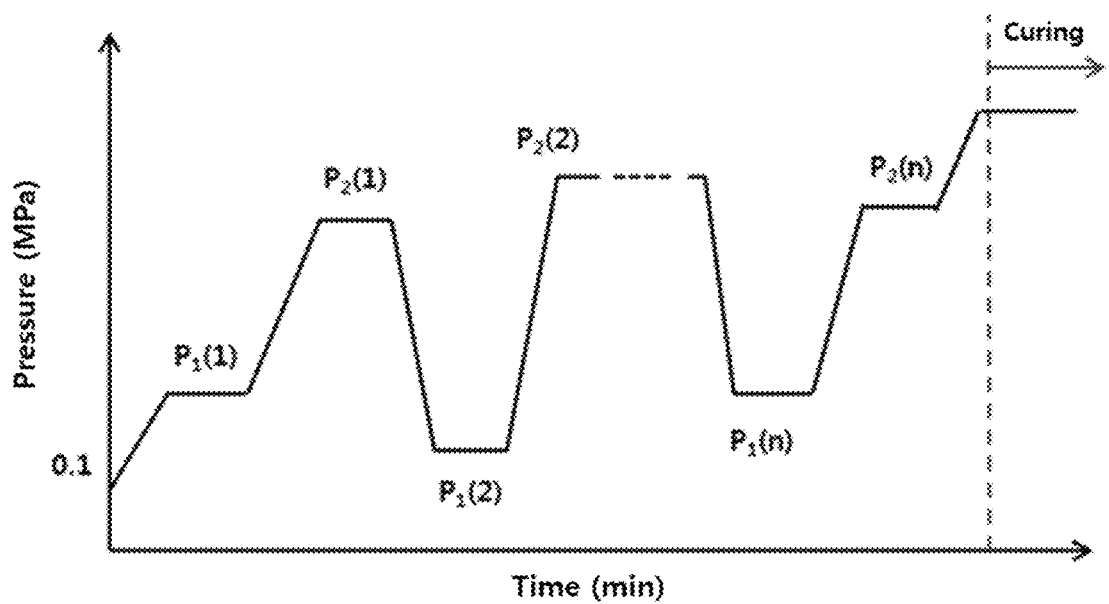
FIG. 3 schematically shows a pressurizing profile for manufacturing a composite blank according to another embodiment of the present disclosure.

FIG. 1 is a flowchart schematically showing the process of manufacturing a composite blank using a laminate for a dental composite blank in which compositions having different colors are laminated according to an embodiment of the present disclosure, and FIGS. 2 and 3 schematically show the pressurizing profile for manufacturing a composite blank according to any one embodiment of the present disclosure.

Hereinafter, a method of manufacturing a dental composite blank of the present disclosure will be described.

With reference to FIGS. 1 to 3, the method of manufacturing the dental composite blank includes (a) pressurizing a laminate for a composite blank having multiple layers having different colors at a first pressure $P_1$, (b) pressurizing the laminate for a composite blank, pressurized at the first pressure, at a second pressure $P_2$ and (c) manufacturing a composite blank by curing the pressurized laminate for a composite blank, in which steps (a) and (b) are each independently performed once or multiple times, and the first pressure $P_1$ is less than or greater than the second pressure $P_2$.

In addition, each of steps (a) and (b) may be performed 1 to 20 times, and steps (a) and (b) may be alternately performed.

Step (a): Pressurizing Laminate for Composite Blank Having Multiple Layers Having Different Colors at First Pressure $P_1$ The method of manufacturing the composite blank according to the present disclosure may include (a) pressurizing a laminate for a composite blank having multiple layers having different colors at a first pressure $P_1$.

The laminate for a composite blank may include 2 to 10 layers, and preferably 3 to 7 layers.

If the number of layers having different colors that are laminated is less than 3, a natural-looking tooth is not realized, which is undesirable, whereas if the number of layers exceeds 10, it is difficult to improve the effect of realizing a natural-looking tooth in proportion therewith, which is undesirable.

The laminate for a composite blank may be configured to include a first composition layer, a second composition layer having a different color laminated on the first composition layer, and a third composition layer having a different color laminated on the second composition layer. In addition, a plurality of additional layers may be laminated thereon.

The layers of the laminate for a composite blank may be laminated in a manner in which a color transitions from light to dark upwards from the bottom layer, in which a color transitions from dark to light upwards from the bottom layer, in which a color transitions from dark to light and then to dark upwards from the bottom layer, or in which a color transitions from light to dark and then to light upwards from the bottom layer.

The viscosity of the composition used for the composition layer that is laminated is set so as to realize a predetermined thickness, and in the case of viscosity having flowability, the thickness of each of the composition layers may be varied through a repeated pressurization step or a curing step, so the aesthetic appearance may be deteriorated.

In addition, step (a) may be performed multiple times, and during step (a) performed multiple times, the pressure $P_1$ (1) in step (a) performed first may be identical to or different from the pressure $P_1$ (2) in step (a) performed later.

The laminate for a composite blank may be placed in a mold and then pressurized. When viewed from the top or the front of the mold in which the composite blank is placed, the mold is in the form of a quadrangular prism, the inside of which is cut and the top and bottom of which are open.

The mold may include nylon, polypropylene, polystyrene, polyphenylene sulfide, polytetrafluoroethylene, polyethersulfone, polyetheretherketone, polyetherimide, polycarbonate, silicone, or the like, and preferably includes nylon.

In addition, at least one layer of the laminate for a composite blank may include 100 parts by weight of an unsaturated-double-bond compound including at least one selected from the group consisting of a monomer having an unsaturated double bond and an oligomer of a monomer having an unsaturated double bond, 50 to 1,000 parts by weight of a filler, 0.01 to 5 parts by weight of a polymerization initiator, and 0.01 to 5 parts by weight of a colorant.

In addition, at least one layer of the laminate for a composite blank may include the filler in an amount of 150 to 700 parts by weight, and preferably 400 to 500 parts by weight, based on 100 parts by weight of the unsaturated-double-bond compound.

The amount of the compound having the unsaturated double bond may vary depending on the field and purpose of use, and such a compound may play an important role in the bonding between the composition layers that are laminated and the extent of dispersion of the filler in the composition layer, and may be an important factor that determines abrasion resistance and workability.

If the amount of the filler is less than 150 parts by weight based on 100 parts by weight of the unsaturated-double-bond compound, the composition layers are easy to laminate due to the high flowability thereof, but the thickness of each of the composition layers may change through the repeated pressurization step or the curing step, so the aesthetic appearance may be deteriorated. On the other hand, if the amount thereof exceeds 700 parts by weight, the compound having the unsaturated double bond may have difficulty forming a polymer, and may not be easily mixed with a filler.

In addition, as the unsaturated-double-bond compound, 2,2-bis[4-(2-hydroxy-3-methacryloxypropoxy)phenyl]propane (Bis-GMA), ethylene glycol dimethacrylate (EGDMA), ethylene glycol diacrylate (EDGA), triethylene glycol dimethacrylate (TEGDMA), triethylene glycol diacrylate (TEGDA), ethoxylated bisphenol A dimethacrylate (Bis-EMA), urethane dimethacrylate (UDMA), polyurethane diacrylate (PUDA), dipentaerythritol pentaacrylate monophosphate (PENTA), 2-hydroxyethyl methacrylate (HEMA), polyalkenoic acid, biphenyl dimethacrylate (BPDM), biphenyl diacrylate (BPDA), or glycerol phosphate dimethacrylate (GPDM) may be used alone or in combinations of two or more thereof.

In addition, as the filler, an inorganic filler or an organic filler may be used alone or in combinations of two or more thereof.

In addition, as the inorganic filler, synthetic amorphous silica, crystalline silica, barium silicate, barium borosilicate, barium fluoroaluminoborosilicate, barium aluminoborosilicate, strontium silicate, strontium borosilicate, strontium aluminoborosilicate, calcium silicate, aluminosilicate, silicon nitride, titanium dioxide, calcium hydroxyapatite, zirconia, or bioactive glass may be used alone or in combinations of two or more thereof.

Here, synthetic amorphous silica, crystalline silica and zirconia may be in the form of particles, and the average diameter of the particles may be 0.01 to 0.5 μm.

Also, barium silicate, barium borosilicate, barium fluoroaluminoborosilicate, barium aluminoborosilicate, strontium silicate, strontium borosilicate, and strontium aluminoborosilicate may be in the form of particles, and the average diameter of the particles may be 0.1 to 3 μm. If the average diameter of the particles is less than 0.1 μm, uniform dispersion thereof in the composition forming each layer may become difficult due to mutual aggregation of the particles, so the mechanical strength may decrease. On the other hand, if the average diameter of the particles is larger than 3 μm, the bonding strength and physical properties may be deteriorated, and after application to a tooth, large particles may be lost due to abrasion, which may deteriorate luster.

In general, since the inorganic filler is hydrophilic, miscibility thereof with the hydrophobic methacrylate-based or acrylate-based monomer may decrease, and thus affinity thereof to the monomer may be increased by including a binder component or treating the surface of the inorganic filler with a silane-coupling agent.

In addition, as the polymerization initiator, a photopolymerization initiator or a thermal polymerization initiator may be used, and preferably a thermal polymerization initiator is used.

In the thermal polymerization reaction, a radical may be formed by heat to thereby initiate polymerization, and the thermal polymerization initiator may be a peroxide initiator such as benzoyl peroxide.

In addition, as the colorant, iron oxide (iron III oxide) or titanium dioxide ($TiO_2$) may be used alone or in combination of two or more thereof.

In addition, as the iron oxide, yellow iron oxide or red iron oxide may be used alone or in combination of two or more thereof.

In addition, the method of manufacturing the composite blank may further include (2) placing a laminate for a composite blank having layers having different colors in a mold, before step (a).

In addition, the method of manufacturing the composite blank may further include (1) manufacturing a laminate for a composite blank by laminating composition layers for a composite blank having different colors, before step (a).

Step (b): Pressurizing Laminate for Composite Blank, Pressurized at First Pressure, at Second Pressure $P_2$ The method of manufacturing the composite blank according to the present disclosure may include (b) pressurizing the laminate for a composite blank, pressurized at the first pressure, at a second pressure $P_2$.

In addition, step (b) may be performed multiple times, and during step (b) performed multiple times, the pressure $P_2$ (1) in step (b) performed first may be identical to or different from the pressure $P_2$ (2) in step (b) performed later.

Each of steps (a) and (b) may be performed 1 to 20 times, and steps (a) and (b) may be alternately performed, and are preferably carried out 3 to 15 times. If the number of times the step is performed exceeds 20, it is difficult to improve the effect of bonding between the composition layers that are laminated in proportion therewith, which is undesirable.

In addition, any one of the first pressure $P_1$ and the second pressure $P_2$ may be 5 to 300 MPa, and preferably 10 MPa to 200 MPa, and the remaining one thereof may be 1 to 10 MPa. If pressurization is performed at a pressure less than 1 MPa, there is no effect of removing bubbles from the laminate, so mechanical strength may deteriorate, which is undesirable. On the other hand, if pressurization is performed at a pressure exceeding 300 MPa, the effect of increasing mechanical strength may be insignificant, which is undesirable.

In addition, a difference between the first pressure $P_1$ and the second pressure $P_2$ may be 5 to 299 MPa.

In addition, at least one of steps (a) and (b) may be performed at a temperature at which the laminate for a composite blank is not cured.

In addition, at least one of steps (a) and (b) may be performed at 10 to 59° C. Upon heating at the time of pressurizing the composite blank obtained by laminating the composition layers having different colors, if the temperature is higher than 59° C., the laminate may be cured before the effect of application of pressure is sufficiently attained, which is undesirable. On the other hand, if the temperature is lower than 10° C., the fluidity of the bubbles present in the composition layers that are laminated is not large, making it difficult to attain the effect of removing bubbles, which is undesirable.

In addition, the laminate for a composite blank may not be cured in each of steps (a) and (b).

In addition, steps (a) and (b) may be performed in an atmosphere of any one of an inert gas and a fluid, and preferably in an inert gas atmosphere.

In addition, the inert gas may include at least one selected from the group consisting of nitrogen, helium, neon, argon, and krypton.

In addition, the fluid may include oil or water.

Step (c): Manufacturing Composite Blank by Curing Pressurized Laminate for Composite Blank The method of manufacturing the composite blank according to the present disclosure may include (c) manufacturing a composite blank by curing the pressurized laminate for a composite blank.

In addition, step (c) may be performed at a pressure of 5 to 300 MPa.

In addition, step (c) may be performed at a temperature at which the laminate for a composite blank is cured.

In addition, step (c) may be performed at a temperature of 80 to 200° C.

In addition, step (c) may be performed for a time ranging from 10 minutes to 24 hours.

Another aspect of the present disclosure pertains to a composite blank having multiple layers.

Here, the multiple layers may include layers having different colors.

In addition, each of the multiple layers may independently include 100 parts by weight of a matrix including a polymer obtained by polymerizing an unsaturated-double-bond compound including at least one selected from the group consisting of a monomer having an unsaturated double bond and an oligomer of a monomer having an unsaturated double bond, 50 to 1,000 parts by weight of a filler dispersed in the matrix, and 0.01 to 5 parts by weight of a colorant dispersed in the matrix and the filler.

In addition, the flexural strength of the composite blank may be 180 MPa or more, preferably 230 MPa or more, more preferably 230 to 300 MPa, and even more preferably 230 to 250 MPa.

In addition, the composite blank may have a color that mimics that of teeth, so it looks like a natural tooth, thereby enhancing an aesthetic appearance.

In addition, the layers of the composite blank may be configured such that the brightness increases toward the upper layer from the lower layer.

Mode for Disclosure

EXAMPLES

Preparation of Composition

Preparation Example 1: Preparation of First Composition

A first composition was prepared using components in the amounts shown in Table 1 below. For the composition excluding the colorant, a tooth color A1 (bright yellow-red tooth color) was formed by adjusting the amount of the colorant using 30 ppm of yellow iron oxide, 15 ppm of red iron oxide, and 100 ppm of titanium dioxide.

TABLE 1

|  |  | Composition | |
|---|---|---|---|
|  |  | Component | Amount (parts by weight) |
| Preparation Example 1: | Monomer | UDMA (urethane dimethacrylate) | 6 |
|  |  | TEGMA (triethylene glycol dimethacrylate) | 11.6 |
|  | Initiator | BPO (benzoyl peroxide) | 0.4 |
|  | Filler | Barium silicate (0.4 μm) | 72 |
|  |  | Silica (50 nm) | 10 |

TABLE 1-continued

|  |  | Composition | |
|---|---|---|---|
|  |  | Component | Amount (parts by weight) |
|  | Colorant | Yellow iron oxide | $30 \times 10^{-4}$ |
|  |  | Red iron oxide | $15 \times 10^{-4}$ |
|  |  | Titanium dioxide | $100 \times 10^{-4}$ |
| Preparation Example 2: | Monomer | UDMA (urethane dimethacrylate) | 6 |
|  |  | TEGMA (triethylene glycol dimethacrylate) | 11.6 |
|  | Initiator | BPO (benzoyl peroxide) | 0.4 |
|  | Filler | Barium silicate (0.4 μm) | 72 |
|  |  | Silica (50 nm) | 10 |
|  | Colorant | Yellow iron oxide | $115 \times 10^{-4}$ |
|  |  | Red iron oxide | $25 \times 10^{-4}$ |
|  |  | Titanium dioxide | $100 \times 10^{-4}$ |
| Preparation Example 3: | Monomer | UDMA (urethane dimethacrylate) | 6 |
|  |  | TEGMA (triethylene glycol dimethacrylate) | 11.6 |
|  | Initiator | BPO (benzoyl peroxide) | 0.4 |
|  | Filler | Barium silicate (0.4 μm) | 72 |
|  |  | Silica (50 nm) | 10 |
|  | Colorant | Yellow iron oxide | $200 \times 10^{-4}$ |
|  |  | Red iron oxide | $35 \times 10^{-4}$ |
|  |  | Titanium dioxide | $100 \times 10^{-4}$ |
| Preparation Example 4: | Monomer | UDMA (urethane dimethacrylate) | 11.8 |
|  |  | TEGMA (triethylene glycol dimethacrylate) | 22.8 |
|  | Initiator | BPO (benzoyl peroxide) | 0.4 |
|  | Filler | Barium silicate (0.4 μm) | 60 |
|  |  | Silica (50 nm) | 5 |
|  | Colorant | Yellow iron oxide | $30 \times 10^{-4}$ |
|  |  | Red iron oxide | $15 \times 10^{-4}$ |
|  |  | Titanium dioxide | $100 \times 10^{-4}$ |
| Preparation Example 5: | Monomer | UDMA (urethane dimethacrylate) | 11.8 |
|  |  | TEGMA (triethylene glycol dimethacrylate) | 22.8 |
|  | Initiator | BPO (benzoyl peroxide) | 0.4 |
|  | Filler | Barium silicate (0.4 μm) | 60 |
|  |  | Silica (50 nm) | 5 |
|  | Colorant | Yellow iron oxide | $115 \times 10^{-4}$ |
|  |  | Red iron oxide | $25 \times 10^{-4}$ |
|  |  | Titanium dioxide | $100 \times 10^{-4}$ |
| Preparation Example 6: | Monomer | UDMA (urethane dimethacrylate) | 11.8 |
|  |  | TEGMA (triethylene glycol dimethacrylate) | 22.8 |
|  | Initiator | BPO (benzoyl peroxide) | 0.4 |
|  | Filler | Barium silicate (0.4 μm) | 60 |
|  |  | Silica (50 nm) | 5 |
|  | Colorant | Yellow iron oxide | $200 \times 10^{-4}$ |
|  |  | Red iron oxide | $35 \times 10^{-4}$ |
|  |  | Titanium dioxide | $100 \times 10^{-4}$ |

Preparation Example 2: Preparation of Second Composition

A second composition was prepared using components in the amounts shown in Table 1. For the composition excluding the colorant, a tooth color A2 (a yellow-red tooth color darker than A1) was formed by adjusting the amount of the colorant using 115 ppm of yellow iron oxide, 25 ppm of red iron oxide, and 100 ppm of titanium dioxide.

Preparation Example 3: Preparation of Third Composition

A third composition was prepared using components in the amounts shown in Table 1. For the composition excluding the colorant, a tooth color A3 (a yellow-red tooth color darker than A2) was formed by adjusting the amount of the colorant using 200 ppm of yellow iron oxide, 35 ppm of red iron oxide, and 100 ppm of titanium dioxide.

Preparation Example 4: Preparation of Fourth Composition

A fourth composition was prepared using components in the amounts shown in Table 1. For the composition excluding the colorant, a tooth color A4 (bright yellow-red tooth color) was formed by adjusting the amount of the colorant using 30 ppm of yellow iron oxide, 15 ppm of red iron oxide, and 100 ppm of titanium dioxide.

Preparation Example 5: Preparation of Fifth Composition

A fifth composition was prepared using components in the amounts shown in Table 1. For the composition excluding the colorant, a tooth color A5 (a yellow-red tooth color darker than A1) was formed by adjusting the amount of the colorant using 115 ppm of yellow iron oxide, 25 ppm of red iron oxide, and 100 ppm of titanium dioxide.

Preparation Example 6: Preparation of Sixth Composition

A sixth composition was prepared using components in the amounts shown in Table 1. For the composition excluding the colorant, a tooth color A6 (yellow-red tooth color darker than A2) was formed by adjusting the amount of the colorant using 200 ppm of yellow iron oxide, 35 ppm of red iron oxide, and 100 ppm of titanium dioxide.

Manufacture of Composite Blank

Example 1: Manufacture of Composite Blank

A first composition layer formed to a thickness of 5 mm after preparation according to Preparation Example 1 was placed, a second composition layer having a thickness of 5 mm was placed thereon, and a third composition layer having a thickness of 5 mm was placed on the second composition layer, thereby manufacturing a laminate for a composite blank in which composition layers having different colors were laminated.

Figure 4A:
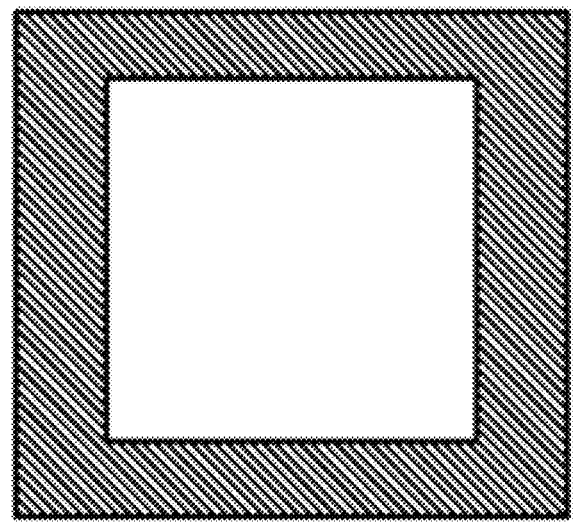
FIG. 4a is a top plan view of a mold for injecting a dental composite paste.
Figure 4B:
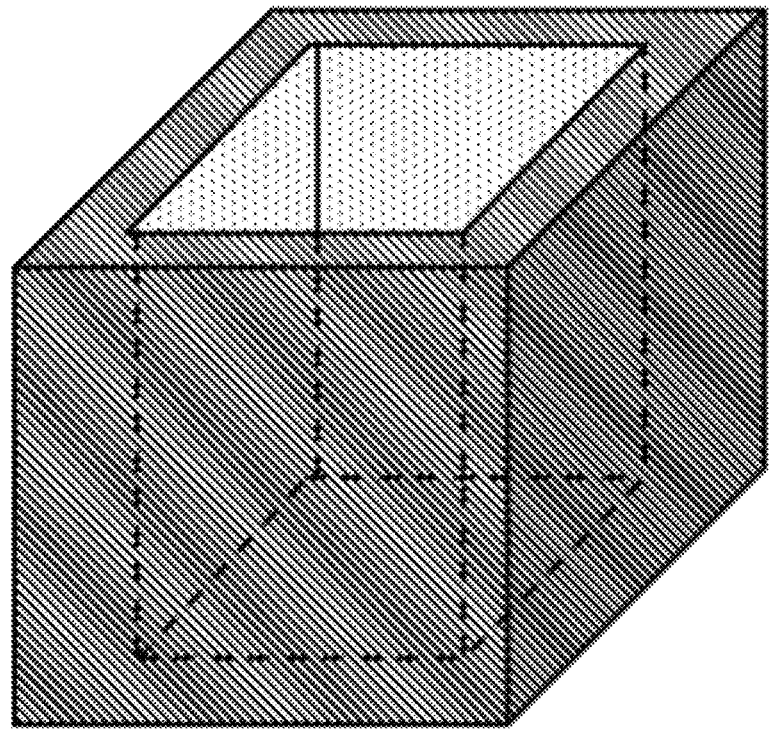
FIG. 4b is a perspective view of the mold for injecting a dental composite paste.

With reference to FIGS. 4a and 4b, a mold in the form of a quadrangular prism, the inside of which was empty and the thickness of which was 1 mm, was manufactured by cutting the inside of a nylon quadrangular prism having a height of 18 mm and a width and a length of 17 mm×17 mm to form a quadrangular prism having a width and a length of 15 mm×15 mm and a height of 18 mm.

The laminate for a composite blank was cut to a size capable of being placed in the mold. The mold in which the cut laminate for a composite blank was placed was fixed in a HIP (hot isostatic pressing) device.

Thereafter, before a curing process, the inner temperature of the HIP device was raised to 55° C., after which pressurization to 40 MPa using nitrogen, maintenance thereof for 10 minutes, depressurization to 5 MPa, and maintenance thereof for 1 minute were repeated 3 times.

Next, as a curing process, the inner temperature of the HIP device was raised to 120° C., the pressure was maintained at 40 MPa, and the composite blank was cured for 2 hours. After 2 hours, the pressure was gradually decreased to atmospheric pressure, after which the resulting dental composite blank was obtained after being separated from the mold.

Example 2: Manufacture of Dental Composite Blank

A dental composite blank was manufactured in the same manner as in Example 1, with the exception that pressurization to 40 MPa using nitrogen, maintenance thereof for 10 minutes, depressurization to 5 MPa, and maintenance thereof for 1 minute were repeated 6 times, rather than repeating pressurization to 40 MPa using nitrogen, maintenance thereof for 10 minutes, depressurization to 5 MPa, and maintenance thereof for 1 minute 3 times, as in Example 1.

Example 3: Manufacture of Dental Composite Blank

A dental composite blank was manufactured in the same manner as in Example 1, with the exception that pressurization to MPa using nitrogen, maintenance thereof for 10 minutes, depressurization to 5 MPa, and maintenance thereof for 1 minute were repeated 6 times, rather than repeating pressurization to 40 MPa using nitrogen, maintenance thereof for 10 minutes, depressurization to 5 MPa, and maintenance thereof for 1 minute 3 times, and also, the inner temperature of the HIP device was raised to 120° C., the pressure was maintained at 20 MPa, and the composite blank was cured for 2 hours, rather than raising the inner temperature of the HIP device to 120° C., maintaining the pressure at 40 MPa, and curing the composite blank for 2 hours, as in Example 1.

Example 4: Manufacture of Dental Composite Blank

A dental composite blank was manufactured in the same manner as in Example 1, with the exception that pressurization to MPa using nitrogen, maintenance thereof for 10 minutes, depressurization to 5 MPa, and maintenance thereof for 1 minute were repeated 6 times, rather than repeating pressurization to 40 MPa using nitrogen, maintenance thereof for 10 minutes, depressurization to 5 MPa, and maintenance thereof for 1 minute 3 times, and also, the inner temperature of the HIP device was raised to 100° C., the pressure was maintained at 40 MPa, and the composite blank was cured for 2 hours, rather than raising the inner temperature of the HIP device to 120° C., maintaining the pressure at 40 MPa, and curing the composite blank for 2 hours, as in Example 1.

Example 5: Manufacture of Dental Composite Blank

A mold in the form of a quadrangular prism, the inside of which was empty and the thickness of which was 1 mm, was manufactured by cutting the inside of a nylon quadrangular prism having a height of 18 mm and a width and a length of 17 mm×17 mm to form a quadrangular prism having a width and a length of 15 mm×15 mm and a height of 18 mm.

The bottom of the mold was closed with a nylon plate. The fourth composition, prepared according to Preparation Example 4, was injected into the mold, the fifth composition was injected thereon, and the sixth composition was injected thereon, so that the thickness ratio of the fourth composition layer to the fifth composition layer to the sixth composition layer was 1:1:1. The mold into which the compositions were injected was fixed in a HIP device. Here, since the fourth to sixth compositions are flowable at room temperature, a mold having a closed bottom was used so that the compositions did not leak outside the mold.

Thereafter, the inner temperature of the HIP device was raised to 55° C., after which pressurization to 40 MPa using nitrogen, maintenance thereof for 10 minutes, depressurization to 5 MPa, and maintenance thereof for 1 minute were repeated 6 times.

Next, the inner temperature of the HIP device was raised to 120° C., the pressure was maintained at 40 MPa, and the composite blank was cured for 2 hours. After 2 hours, the pressure was gradually decreased to atmospheric pressure, after which the resulting dental composite blank was obtained after being separated from the mold.

Example 6: Manufacture of Dental Composite Blank

A dental composite blank was manufactured in the same manner as in Example 5, with the exception that pressurization to MPa using nitrogen, maintenance thereof for 10 minutes, depressurization to 5 MPa, and maintenance thereof for 1 minute were repeated 6 times, rather than repeating pressurization to 40 MPa using nitrogen, maintenance thereof for 10 minutes, depressurization to 5 MPa, and maintenance thereof for 1 minute 6 times, and also, the inner temperature of the HIP device was raised to 120° C., the pressure was maintained at 20 MPa, and the composite blank was cured for 2 hours, rather than raising the inner temperature of the HIP device to 120° C., maintaining the pressure at 40 MPa, and curing the composite blank for 2 hours, as in Example 5.

Example 7: Manufacture of Dental Composite Blank

A dental composite blank was manufactured in the same manner as in Example 5, with the exception that the inner temperature of the HIP device was raised to 100° C., the pressure was maintained at 40 MPa, and the composite blank was cured for 2 hours, rather than raising the inner temperature of the HIP device to 120° C., maintaining the pressure at 40 MPa, and curing the composite blank for 2 hours, as in Example 5.

Example 8: Manufacture of Dental Composite Blank

A dental composite blank was manufactured in the same manner as in Example 1, with the exception that the inner temperature of the HIP device was raised to 55° C., after which pressurization to 40 MPa using air, maintenance thereof for 10 minutes, depressurization to 5 MPa, and maintenance thereof for 1 minute were repeated 6 times, rather than repeating pressurization to 40 MPa using nitrogen, maintenance thereof for 10 minutes, depressurization to 5 MPa, and maintenance thereof for 1 minute 3 times, as in Example 1.

Comparative Example 1: Manufacture of Dental Composite Blank

A dental composite blank was manufactured in the same manner as in Example 1, with the exception of not performing repetition of pressurization to 40 MPa using nitrogen, maintenance thereof for 10 minutes, depressurization to 5 MPa, and maintenance thereof for 1 minute 3 times, after raising the inner temperature of the HIP device to 55° C., as in Example 1.

TABLE 2

| | Process before curing | | | | | Curing process | |
| --- | --- | --- | --- | --- | --- | --- | --- |
| Classification | Pressurization | Depressurization | Number of repetitions | Temperature | Gas | Temperature | Pressurization |
| Example 1 | 40 MPa | 5 MPa | 3 | 55° C. | Nitrogen | 120° C. | 40 MPa |
| Example 2 | 40 MPa | 5 MPa | 6 | 55° C. | Nitrogen | 120° C. | 40 MPa |
| Example 3 | 20 MPa | 5 MPa | 6 | 55° C. | Nitrogen | 120° C. | 20 MPa |
| Example 4 | 40 MPa | 5 MPa | 6 | 55° C. | Nitrogen | 100° C. | 40 MPa |
| Example 5 | 40 MPa | 5 MPa | 6 | 55° C. | Nitrogen | 120° C. | 40 MPa |
| Example 6 | 20 MPa | 5 MPa | 6 | 55° C. | Nitrogen | 120° C. | 20 MPa |
| Example 7 | 40 MPa | 5 MPa | 6 | 55° C. | Nitrogen | 100° C. | 40 MPa |
| Example 8 | 40 MPa | 5 MPa | 6 | 55° C. | Air | 120° C. | 40 MPa |
| Comparative Example 1 | — | — | — | — | — | 120° C. | 40 MPa |

Test Examples

Test Example 1: Measurement of Cracks, Bubbles, and Flexural Strength of Dental Composite Blank 10 plates, obtained by slicing the composite blank manufactured in each of Examples 1 to 8 and Comparative Example 1 at thickness intervals of 1 mm, were observed with a 10× magnification loupe, and the presence or absence of cracks or bubbles was observed.

The composite blank manufactured in each of Examples 1 to 8 and Comparative Example 1 was processed to a thickness of 1.2 mm±0.2 mm, a width of 4.0 mm±0.2 mm, and a length of 14 mm or more, the surface thereof was polished with No. 2000 abrasive paper, and a 3-point bending test was conducted under the conditions of an interpoint distance of 12 mm and a crosshead speed of 1.0 mm/min (JDMAS 245:2017 Resin material for dental cutting for CAD/CAM).

The results of testing under the above conditions are shown in Table 3 below.

TABLE 3

| | Cracks | Bubbles | Flexural strength |
| --- | --- | --- | --- |
| Example 1 | Not found | Not found | 241 MPa |
| Example 2 | Not found | Not found | 250 MPa |

TABLE 3-continued

|  | Cracks | Bubbles | Flexural strength |
|---|---|---|---|
| Example 3 | Not found | Not found | 242 MPa |
| Example 4 | Not found | Not found | 235 MPa |
| Example 5 | Not found | Not found | 200 MPa |
| Example 6 | Not found | Not found | 194 MPa |
| Example 7 | Not found | Not found | 189 MPa |
| Example 8 | Cracked | Not found | 182 MPa |
| Comparative Example 1 | Cracked | Bubbled | 150 MPa |

With reference to Table 3 and FIGS. 2 and 3, neither cracks nor bubbles were observed in the dental composite blanks manufactured according to Examples 1 to 7, and the flexural strength thereof was evaluated to be superior. In addition, the dental composite blank manufactured according to Example 8 using air in lieu of nitrogen gas was slightly decreased in flexural strength due to the occurrence of cracks in the block. Meanwhile, the physical properties of the dental composite blank manufactured according to Example 2 were regarded as the best.

Therefore, in the dental composite blank manufactured according to Examples 1 to 7, bubbles or cracks were not generated by repeating pressurization and depressurization before curing the dental composite composition layers that were laminated, and also, mechanical properties thereof were improved because of the high bonding strength between the composite composition layers that were laminated, compared to the dental composite blank manufactured according to Comparative Example 1.

Test Example 2: Comparison of Bonding Surfaces Between Composition Layers of Dental Composite Blank FIG. 5 is an optical microscope image of a cross-section taken by cutting perpendicular to the bonding surfaces between the composition layers of the composite blank manufactured according to Example 2, and FIG. 6 is optical microscope images of a cross-section taken by cutting perpendicular to the bonding surfaces between the composition layers of the composite blank manufactured according to Comparative Example 1.

Figure 5:
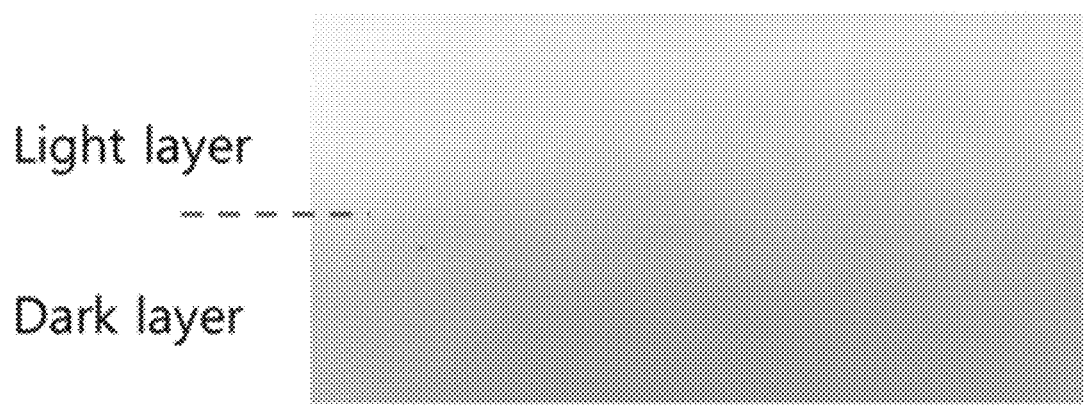
FIG. 5 is an optical microscope image of a cross-section taken by cutting perpendicular to the bonding surfaces between the composition layers of the composite blank manufactured according to Example 2.
Figure 6:
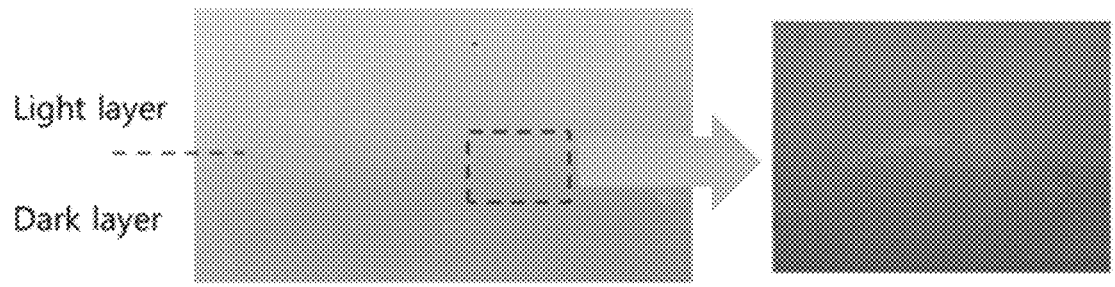
FIG. 6 is optical microscope images of a cross-section taken by cutting perpendicular to the bonding surfaces between the composition layers of the composite blank manufactured according to Comparative Example 1.

With reference to FIGS. 5 and 6, it was confirmed that the bonding surfaces between the composition layers of the composite blank manufactured according to Example 2 were naturally connected without defects between the composition layers after curing, and also that the bonding surfaces between the composition layers of the composite blank manufactured according to Comparative Example 1 had defects between the composition layers after curing.

The scope of the present disclosure is represented by the claims below rather than the aforementioned detailed description, and all changes or modified forms that are capable of being derived from the meaning, range, and equivalent concepts of the appended claims should be construed as being included in the scope of the present disclosure.

INDUSTRIAL APPLICABILITY

According to a dental composite blank of the present disclosure and a method of manufacturing the same, the dental composite blank is configured to include layers having different colors, so a color gradient similar to that of a natural tooth can be realized, and thus a superior aesthetic appearance for prostheses can be exhibited.

In addition, according to the dental composite blank of the present disclosure and the method of manufacturing the same, the composition layers for a composite blank having different colors are repeatedly pressurized at different pressures before curing, so bubbles between the layers are capable of being removed, thereby increasing the bonding strength between the composition layers, ultimately preventing interlayer separation and improving mechanical properties.

The invention claimed is:

1. A method of manufacturing a dental composite blank, comprising:
(1) manufacturing a laminate for a composite blank by laminating composition layers for a composite blank having different colors;
(2) placing the laminate for a composite blank having layers having different colors in a mold;
(a) pressurizing the laminate for a composite blank having multiple layers having different colors at a first pressure (P1);
(b) pressurizing the laminate for a composite blank, pressurized at the first pressure, at a second pressure (P2); and
(c) manufacturing the dental composite blank by curing the pressurized laminate for a composite blank,
wherein
steps (a) and (b) are each independently performed once or multiple times, and the first pressure (Pi) is less than or greater than the second pressure (P2),
each of steps (a) and (b) is performed 1 to 20 times, and steps (a) and (b) are alternately performed, and
the first pressure (P1) and the second pressure (P2) are 5 to 300 MPa and 1 to 10 MPa, respectively.

2. The method of claim 1, wherein step (a) is performed multiple times, and during step (a) performed multiple times, a pressure ($P_1(1)$) in step (a) performed first is identical to or different from a pressure ($P_1(2)$) in step (a) performed later.

3. The method of claim 1, wherein step (b) is performed multiple times, and during step (b) performed multiple times, a pressure ($P_2(1)$) in step (b) performed first is identical to or different from a pressure ($P_2(2)$) in step (b) performed later.

4. The method of claim 1, wherein a difference between the first pressure ($P_1$) and the second pressure ($P_2$) is 5 to 299 MPa.

5. The method of claim 1, wherein each of steps (a) and (b) is performed at a temperature at which the laminate for a composite blank is not cured.

6. The method of claim 1, wherein each of steps (a) and (b) is performed at 10 to 59° C.

7. The method of claim 1, wherein steps (a) and (b) are performed in an atmosphere of any one of an inert gas and a fluid.

8. The method of claim 1, wherein step (c) is performed at a pressure of 5 to 300 MPa.

9. The method of claim 1, wherein the laminate for a composite blank comprises 2 to 10 layers.

10. The method of claim 1, wherein step (c) is performed at a temperature at which the laminate for a composite blank is cured.

11. The method of claim 1, wherein step (c) is performed at a temperature of 80 to 200° C.

12. The method of claim 1, wherein at least one layer of the laminate for a composite blank comprises 100 parts by weight of an unsaturated-double-bond compound comprising at least one selected from the group consisting of a monomer having an unsaturated double bond and an oligomer of a monomer having an unsaturated double bond, 50 to 1,000 parts by weight of a filler, 0.01 to 5 parts by weight of a polymerization initiator, and 0.01 to 5 parts by weight of a colorant.

* * * * *